United States Patent
Yeh et al.

(10) Patent No.: US 7,932,962 B2
(45) Date of Patent: Apr. 26, 2011

(54) LIQUID CRYSTAL DISPLAY DEVICE AND DEFECT REPAIRING METHOD FOR THE SAME

(75) Inventors: Chang Ching Yeh, Magong (TW); Te Cheng Chung, Jhongli (TW); Ming Tien Lin, Lujhou (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 12/549,288

(22) Filed: Aug. 27, 2009

(65) Prior Publication Data
US 2009/0315035 A1 Dec. 24, 2009

Related U.S. Application Data

(63) Continuation of application No. 11/356,202, filed on Feb. 17, 2006, now abandoned.

(51) Int. Cl.
G02F 1/1343 (2006.01)
H01L 21/00 (2006.01)
(52) U.S. Cl. ............... 349/39; 349/38; 349/54; 349/55; 349/58; 349/59; 349/187; 349/192; 349/197; 438/30
(58) Field of Classification Search .............. 349/38–39, 349/54–55, 58–59, 192, 197, 187; 438/30
See application file for complete search history.

(56) References Cited

U.S. PATENT DOCUMENTS

| | | | |
|---|---|---|---|
| 5,132,819 A * | 7/1992 | Noriyama et al. | 349/55 |
| 5,691,786 A * | 11/1997 | Nakai | 349/39 |
| 6,259,494 B1 * | 7/2001 | Kawai et al. | 349/39 |
| 6,855,955 B2 | 2/2005 | Jeon et al. | |
| 6,882,375 B2 | 4/2005 | Kim | |
| 6,888,589 B2 * | 5/2005 | Kim et al. | 349/54 |
| 7,053,977 B2 * | 5/2006 | Chang | 349/192 |
| 7,330,222 B2 * | 2/2008 | Shiraki et al. | 349/54 |
| 7,417,692 B2 * | 8/2008 | Lin | 349/38 |
| 7,427,777 B2 * | 9/2008 | Tsou et al. | 257/59 |

* cited by examiner

Primary Examiner — Brian M. Healy
Assistant Examiner — Guy G Anderson

(57) ABSTRACT

A liquid crystal display device includes a pixel electrode, a thin film transistor, a gate line electrically coupled to the pixel through the thin film transistor and a first auxiliary layer having a first connecting portion overlapped with the pixel electrode and a second connecting portion overlapped with the gate line. The pixel electrode is non-overlapped with the gate line and the first auxiliary layer is electrically insulated from the pixel electrode and the gate line. When a white defect occurs, the pixel electrode is electrically connected to the gate line through the first auxiliary layer thereby repairing the white defect as a black defect.

19 Claims, 5 Drawing Sheets

LIQUID CRYSTAL DISPLAY DEVICE AND DEFECT REPAIRING METHOD FOR THE SAME

RELATED APPLICATIONS

The present application is a continuation of U.S. application Ser. No. 11/356,202, filed Feb. 17, 2006, the disclosure of which is hereby incorporated by reference herein in its entirety.

BACKGROUND OF THE INVENTION

1. Field of the Invention

This invention generally relates to a liquid crystal display device, and more particularly to a liquid crystal display device having a pixel repairing structure.

2. Description of the Related Art

In the manufacturing process of a liquid crystal display (LCD) device, pixel defects are liable to be generated and should be repaired, which causes the manufacturing cost inevitably to be increased. Typically, the pixel defects are divided into white defects and dark defects, wherein the white defects are easily recognized by naked eyes. Therefore, it is preferable that the white defects should be repaired as black defects, which are always dark and not easily recognized by naked eyes.

One of conventional methods for repairing a white defect as a dark defect • is widely used in an LCD device 10 as shown in FIG. 1, in which a pixel electrode 12a has at least one part 13 overlapped with a gate line 14 to form a storage capacitor for enhancing the charge storing capacity between the pixel electrode 12a and a common electrode (not shown). When a white defect is caused by poor contact between the pixel electrode 12a and a switching element 16 or by malfunction of the switching element 16, a short circuit is formed between the part 13 of the pixel electrode 12a and the gate line 14 through a welding point 20 formed by a laser such that the white defect can be repaired as a dark defect. U.S. Pat. No. 6,882,375 B2 issued to Kim on Apr. 19, 2005 discloses that a pixel electrode has a repair member overlapped with a neighboring front gate line.

In addition, some of conventional methods for repairing a white defect as a dark defect are used in an LCD device (not shown), in which a pixel electrode is overlapped with a storage line (also referred to as storage capacitor line) to form a storage capacitor. U.S. Pat. No. 6,855,955 B2 issued to Jeon et al. (hereinafter Jeon) on Feb. 15, 2005 discloses that a pixel electrode is electrically connected to a storage capacitor conductor through a contact hole, wherein the storage capacitor conductor has a repairing portion overlapped with the gate line. When a white defect occurs, the gate line is short-circuited with the pixel electrode through the repair portion such that the white defect can be repaired as a dark defect.

However, in the above-mentioned conventional methods, at least one connecting portion (e.g. the part 13 in FIG. 1, the repair member disclosed by Kim and the repairing portion disclosed by Jeon) electrically connected to the pixel electrode is overlapped with the gate line such that a capacitor is formed between the connecting portion and the gate line and thus increases the capacitive load on the gate line. In particular, when the number of pixels along the gate line is large, the capacitive load of the gate line may become considerable and thus cause the delay of the scan signal transmitted in the gate line.

SUMMARY OF THE INVENTION

The present invention provides a liquid crystal display device, which comprises a thin film transistor and a first auxiliary layer having a first portion overlapped with a pixel electrode and a second portion overlapped with a gate line, wherein the pixel electrode is non-overlapped with the gate line and the first auxiliary layer is electrically insulated from the pixel electrode and the gate line.

The present invention further provides a defect repairing method, which is applied to the above-mentioned liquid crystal display device, wherein the defect repairing method comprises a step of making the pixel electrode electrically isolated from the thin film transistor, a step of connecting the first portion of the first auxiliary layer with the pixel electrode and a step of connecting the second portion of the first auxiliary layer with the gate line.

Furthermore, a second auxiliary layer is overlapped with the first portion of the first auxiliary layer thereby facilitating the electrical connection between the first portion and the pixel electrode.

According to the defect repairing method of the present invention, the pixel electrode can be electrically connected to the gate line through the first auxiliary layer thereby repairing a white defect as a black defect without signal delay problem caused by the capacitive load of the gate line.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
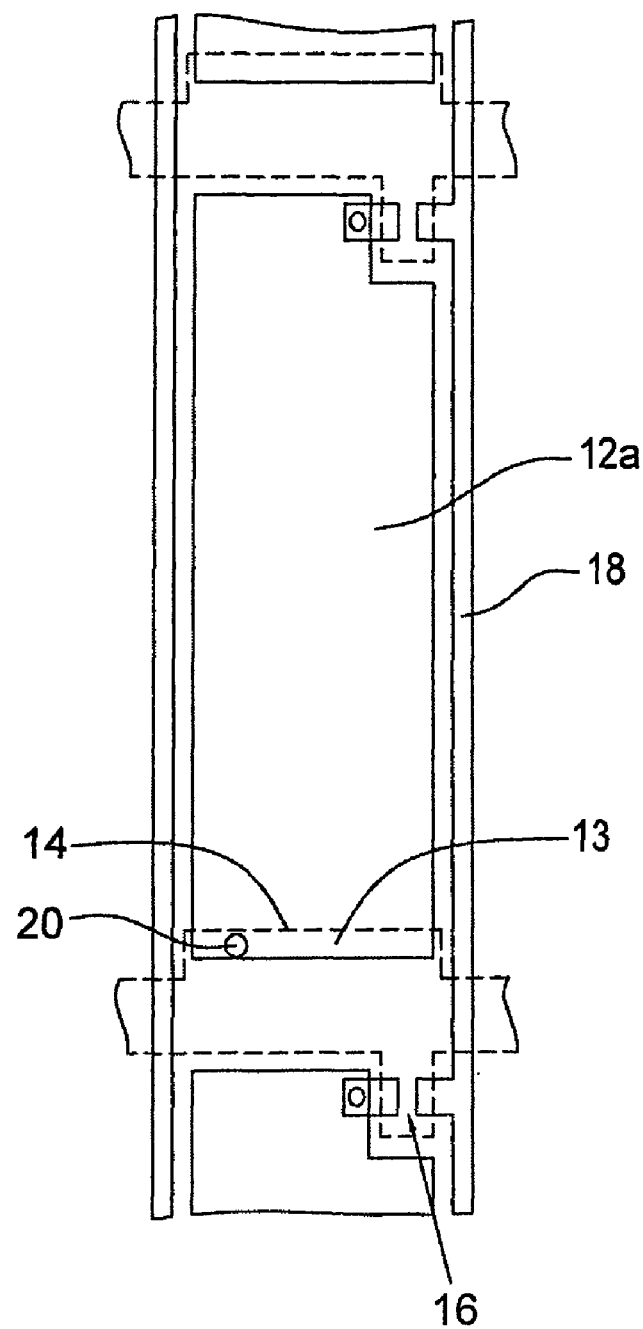
FIG. 1 shows a partial plan view of a conventional liquid crystal display device.
Figure 2:
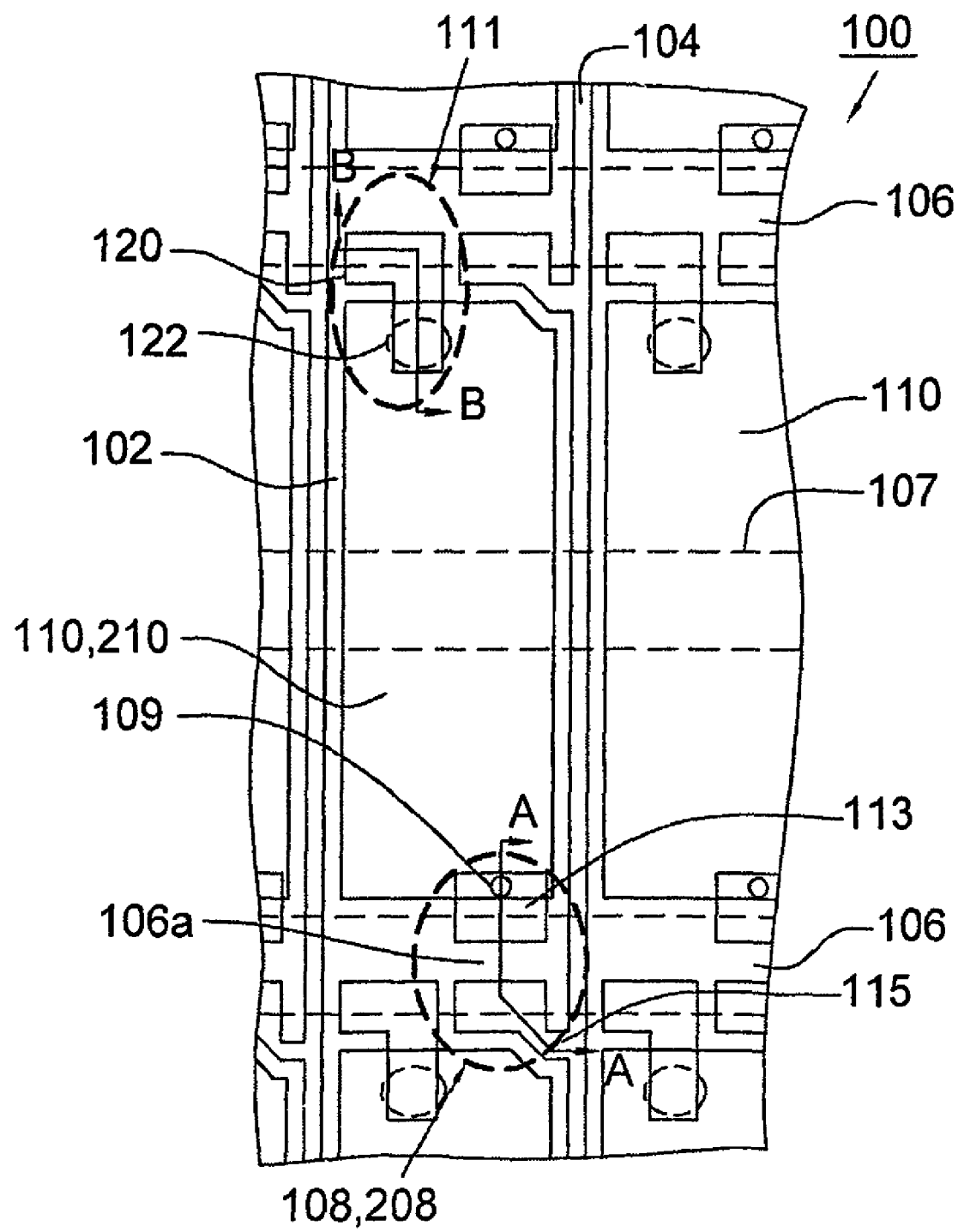
FIG. 2 shows a partial plan view of a liquid crystal display device according to one embodiment of the present invention.

FIG. 2 shows a partial plan view of a liquid crystal display device 100 according to one embodiment of the present invention. The liquid crystal display device 100 comprises a plurality of pixel regions 102, a plurality of data lines 104, a plurality of gate lines 106, a plurality of storage capacitor lines 107, and a plurality of thin film transistors 108. In FIG. 2, the gate lines 106 and storage capacitor lines 107 are denoted by the dotted lines and formed on a substrate (not shown).

The plurality of pixel regions 102 are arranged in rows and columns to form a matrix, and each pixel region 102 has a pixel electrode 110 and a pixel repairing structure 111 formed thereon. The data line 104 is electrically coupled, through all the thin film transistors 108 at the same column, to all the pixel electrodes 110 of the pixel regions 102 arranged in the same column. The gate line 106 is electrically coupled, through all the thin film transistors 108 in the same row, to all the pixel electrodes 110 of the pixel regions 102 arranged in the same row. The storage capacitor line 107 is formed across the pixel regions 102 arranged in a row and overlapped with the pixel electrodes 110 to form a storage capacitor for enhancing the charge storing capacity between the pixel electrode 110 and a common electrode formed on a counter substrate (not shown) facing the above-mentioned substrate. In the other word, the storage capacitor line 107 is electrically insulated from the pixel electrodes 110 and data lines 104. The thin film transistor 108 is formed close to the intersection of the data line 104 and the gate line 106. The thin film transistor 108 has a source electrode 108a electrically connected to the data line 104, a drain electrode 108b electrically connected to the pixel electrode 110 through a contact hole 109. In this embodiment, the source electrode 108a and the drain electrode 108b are partially overlapped with a section 106a of the gate line 106 so that the section 106a of the gate line 106 can function as a gate electrode of the thin film transistor 108. In addition, it should be noted that the terms "source electrode" and "drain electrode" could be alternatively used in accordance with the direction of the current flow in the thin film transistor 108.

Figure 3:
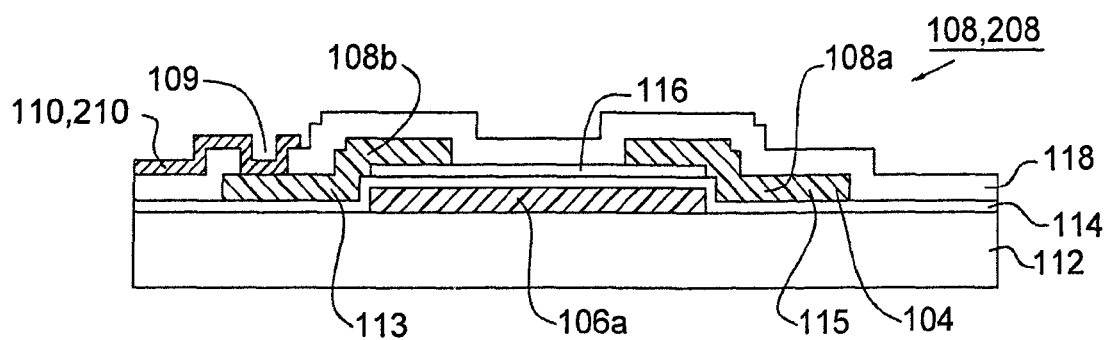
FIG. 3 shows a cross-sectional view taken along line A-A of FIG. 2 for illustrating the thin film transistor.

FIG. 3 shows a cross-sectional view taken along line A-A of FIG. 2 for illustrating the thin film transistor 108. The thin film transistor 108 has the gate electrode, i.e. the section 106a of the gate line 106, formed on a substrate 112. A gate insulating layer 114 is formed to cover the section 106a of the gate line 106. A semiconductor layer 116 is formed on the gate insulating layer 114 and overlapped with the section 106a of the gate line 106. The source electrode 108a and the drain electrode 108b are formed on the gate insulating layer 114 with parts of them covering the semiconductor layer 116. A protective layer 118 is formed on the gate insulating layer 114 to cover the source electrode 108a, the drain electrode 108b, and parts of the semiconductor layer 116. The pixel electrode 110 is formed on the protective layer 118 and electrically connected to the drain electrode 108b through the contact hole 109 formed in the protective layer 118.

Referring to FIG. 3, the thin film transistor 108 has a predetermined channel formed between the source electrode 108a and the drain electrode 108b on the semiconductor layer 116. When the gate line 106 receives a scan signal, it transmits the scan signal to the section 106a, i.e. the gate electrode of the thin film transistor 108, for switching on/off the predetermined channel of the thin film transistor 108. In addition, when the section 106a of the gate line 106 is applied with the scan signal, the source electrode 108a can receive a data signal from the data line 104 and then transfer the data signal to the drain electrode 108b through the predetermined channel. Afterward, the data signal can be applied to the pixel electrode 110 by the drain electrode 108b such that a potential difference can be generated between the pixel electrode 110 and the common electrode formed on the counter substrate (not shown) facing the substrate 112 for rotating the liquid crystal (not shown) within a pixel cell, and then form a desired picture. The pixel cell described in this embodiment is the basic unit to form a color, e.g. one of the red, green and blue.

Figure 4:
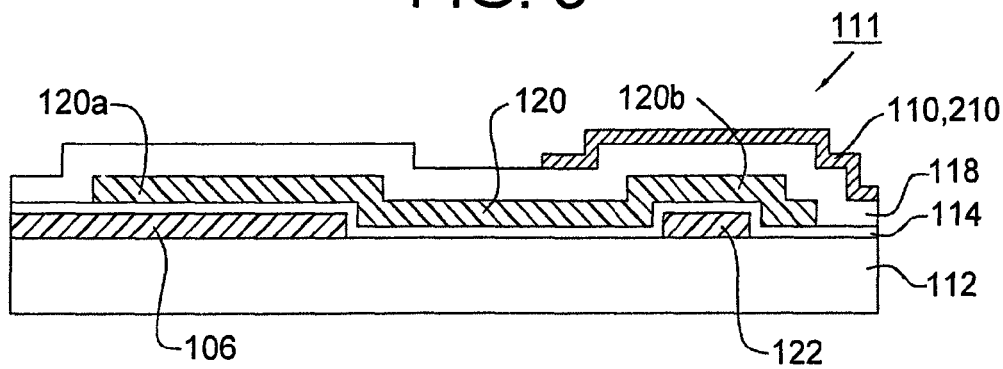
FIG. 4 shows a cross-sectional view taken along line B-B of FIG. 2 for illustrating the pixel repairing structure.

FIG. 4 shows a cross-sectional view taken along line B-B of FIG. 2 for illustrating the pixel repairing structure 111. In this embodiment, the pixel repairing structure 111 is formed to repair a defective pixel and includes a first auxiliary layer 120 and a second auxiliary layer 122. The first auxiliary layer 120 is formed on the gate insulating layer 114 and covered with the protective layer 118 such that it can be electrically insulated from the gate line 106, the second auxiliary layer 122 and the pixel electrode 110. The first auxiliary layer 120 has a connecting portion 120a overlapped with the gate line 106, and a connecting portion 120b overlapped with the pixel electrode 110. The second auxiliary layer 122 as a dummy layer is formed on the substrate 112, electrically isolated from the gate line 106, and covered with the gate insulating layer 114. In more detail, the second auxiliary layer 122 is overlapped with the connecting portion 120b of the first auxiliary layer 120 and electrically insulated from the first auxiliary layer 120 and the pixel electrode 110. In the other word, the second auxiliary layer 122 is an electrically insulated island. Furthermore, in normal pixel regions 102 as shown in FIG. 2, the pixel repairing structure 111 is electrically insulated with surroundings, such as the gate lines 106, the data lines 104, the thin film transistors 108, the pixel electrodes 110 and the storage capacitor lines 107.

Now referring to FIGS. 2 to 4, if a defect occurs at the predetermined channel in one of the thin film transistors 108, e.g. the thin film transistor also denoted by the numeral 208 shown in FIG. 2, then the pixel electrode 210 electrically connected to the thin film transistor 208 is defective, so that the pixel cell formed by the pixel electrode 210 becomes a bright dot, i.e. a white defect. The defect repairing method of the present invention for repairing such a defective pixel cell will be described below.

Figure 5:
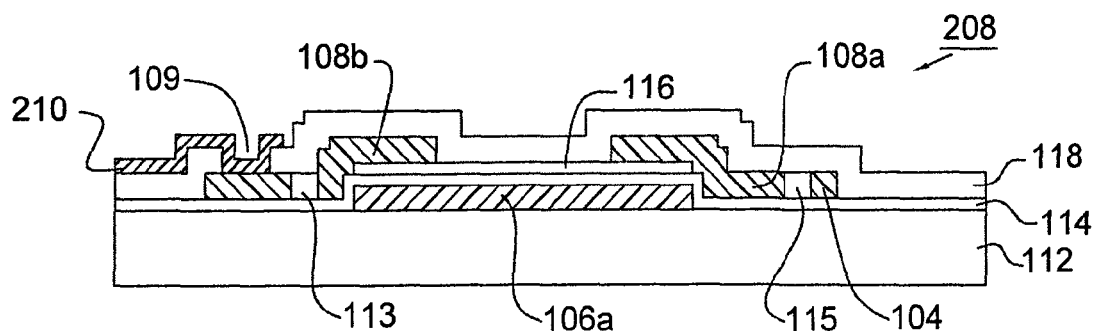
FIG. 5 shows a cross-sectional view taken along line A-A of FIG. 2 for illustrating the thin film transistor with its drain electrode and source electrode being cut off by a laser.

In this embodiment, it is assumed that the pixel electrode also denoted by the numeral 210 is found defective and causes a bright dot. In order to repair the white defect, firstly, the electrical path between the pixel electrode 210 and the drain electrode 108b of the thin film transistor 208 should be cut off such that the pixel electrode 210 can be electrically isolated from the drain electrode 108b. The electrical path can be cut by using a laser to cut off the connecting part 113 of the drain electrode 108b and the connecting part 115 of the source electrode 108a as shown in FIG. 5, such that the pixel electrode 210 is electrically isolated from the thin film transistor 208.

Figure 6:
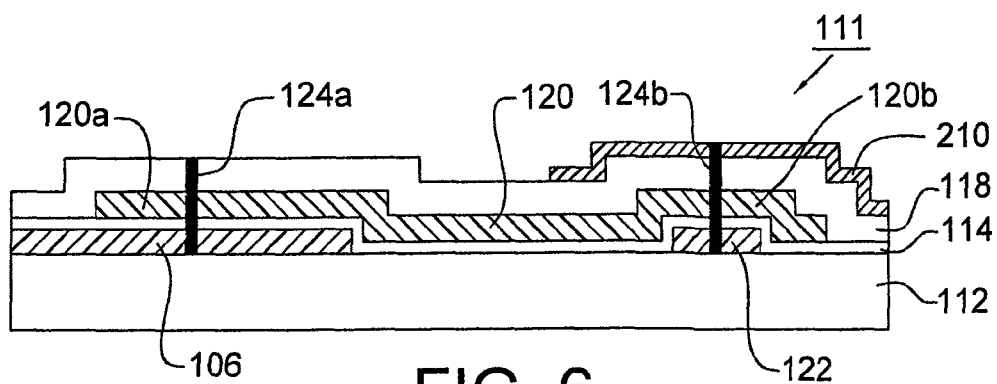
FIG. 6 shows a cross-sectional view taken along line B-B of FIG. 2 for illustrating the pixel repairing structure, which has two welding points formed by a laser.

Now referring to FIGS. 2 and 4, after the above cutting step is implemented, an electrical path between the pixel electrode 210 and the gate line 106 is then created such that the pixel electrode 210 can be repaired as a dark dot, i.e. black defect. The electrical path can be created by using the laser to form two welding points 124a and 124b in the pixel repairing structure 111 as shown in FIG. 6. The welding point 124a is formed by welding the connecting portion 120a of the first auxiliary layer 120 with the gate line 106. The welding point 124b could be formed by two methods: one is to weld the connecting portion 120b of the first auxiliary layer 120 with the pixel electrode 210, and the other is further to weld the second auxiliary layer 122 with the connecting portion 1206 and the pixel electrode 210 for facilitating the electrical connection between the connecting portion 120b and the pixel electrode 210. When the two welding points 124a and 124b are formed by the laser, the pixel electrode 210 can be electrically connected to the gate line 106 through the first auxiliary layer 120. Accordingly, the pixel electrode 210 can be applied with a potential generated from the gate line 106 so that the defective pixel cell can be repaired and displayed as a dark dot.

FIGS. 7A-7D are cross-sectional views for illustrating the method for making the pixel repairing structure 111 shown in FIG. 4. A method for making the liquid crystal display device 100 will be described below with reference to FIGS. 2, 3 and 7A-7D.

Figure 7A:
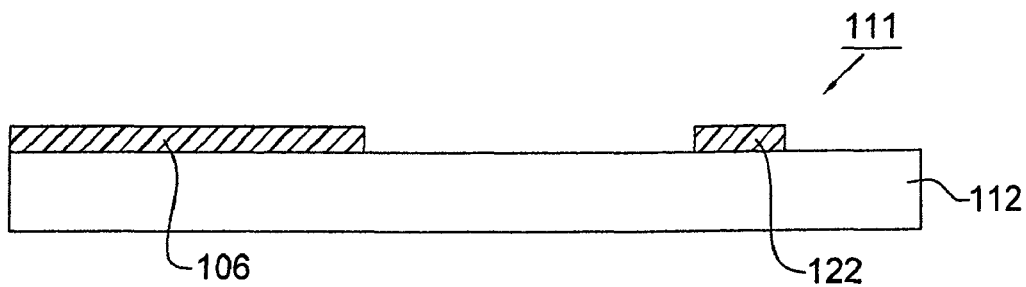
FIGS. 7A-7D are cross-sectional views for illustrating the method for making the pixel repairing structure shown in FIG. 4.

Referring to FIGS. 2, 3 and 7A, a gate line 106, a gate line section 106*a*, a storage capacitor line 107 (see FIG. 2), and a second auxiliary layer 122 are formed on a substrate 112. The gate line 106, the gate line section 106*a*, the storage capacitor line 107 and the second auxiliary layer 122 are formed by depositing at least one metal layer, e.g. aluminum (Al), copper (Cu), chromium (Cr), silver (Ag), gold (Au), molybdenum (Mo) or any other metal layer or any stacked metal layer, through a sputtering technique or other techniques, and then patterning it with a first mask.

Figure 7B:
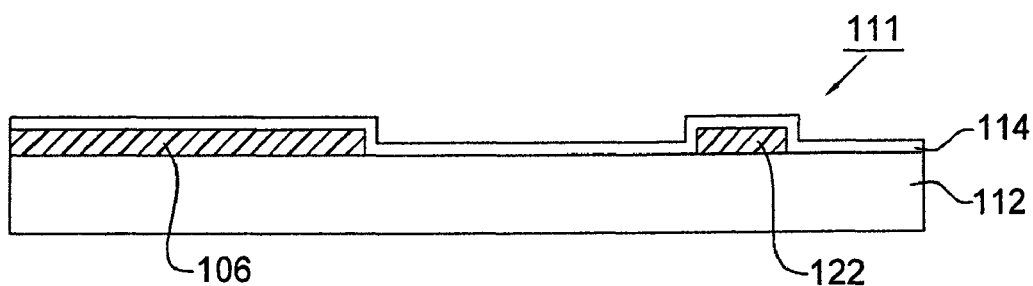

Referring to FIGS. 2, 3 and 7B, a gate insulating layer 114 is formed on the substrate 112 to cover the gate line 106, the gate line section 106*a*, the storage capacitor line 107 (see FIG. 2), and the second auxiliary layer 122 (see FIGS. 2 and 7B). The gate insulating layer 114 can be formed of at least one insulating material, e.g. silicon nitride (SiNx), silicon oxide (SiOx), or stacked thereof or any other such material or any other transparent material. Afterward, a semiconductor layer 116 is formed on the gate insulating layer 114 and overlapped with the gate line section 106a. The semiconductor layer 116 is formed by depositing a semiconductor material, e.g. amorphous silicon, on the gate insulating layer 114 and then patterning it with a second mask.

Figure 7C:
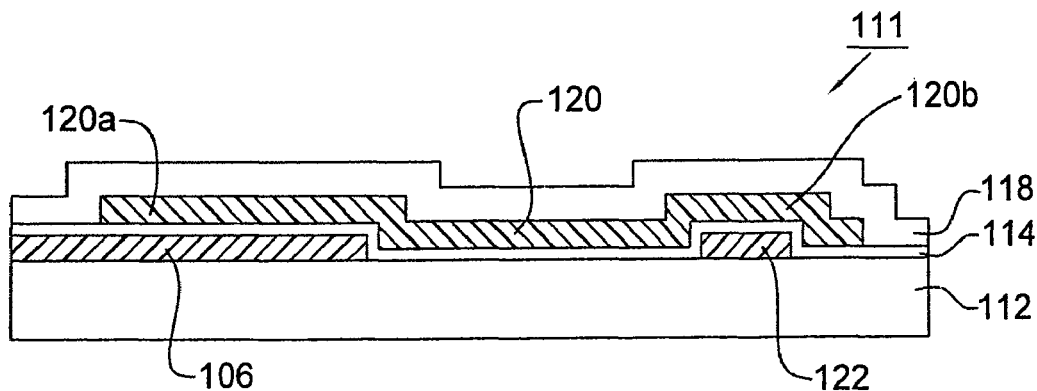

Referring to FIGS. 2, 3 and 7C, a data line 104, a source electrode 108*a* connected to the data line 104, a drain electrode 108*b* and a first auxiliary layer 120 are formed on the gate insulating layer 114. Further, the source electrode 108*a* and the drain electrode 108*b* are formed on the gate insulating layer 114 with parts of them covering the semiconductor layer 116. The data line 104, the source electrode 108*a*, the drain electrode 108*b* and the first auxiliary layer 120 are formed by entirely depositing at least one metal layer, e.g. magnesium (Mg), calcium (Ca), aluminum (Al), Barium (Ba), lithium (Li), silver (Ag), gold (Au) or any other metal layer or any stacked metal layer, through a CVD technique or a sputtering technique, and then patterning it with a third mask. Afterward, a protective layer 118 is formed on the gate insulating layer 114 to cover the data line 104, the source electrode 108*a*, the drain electrode 108*b*, parts of the semiconductor layer 116 and the first auxiliary layer 120.

Referring to FIGS. 2 and 3, the protective layer 118 is patterned with a fourth mask to form a contact hole 109 such that a part of the drain electrode 108*b* is exposed from the contact hole 109.

Figure 7D:
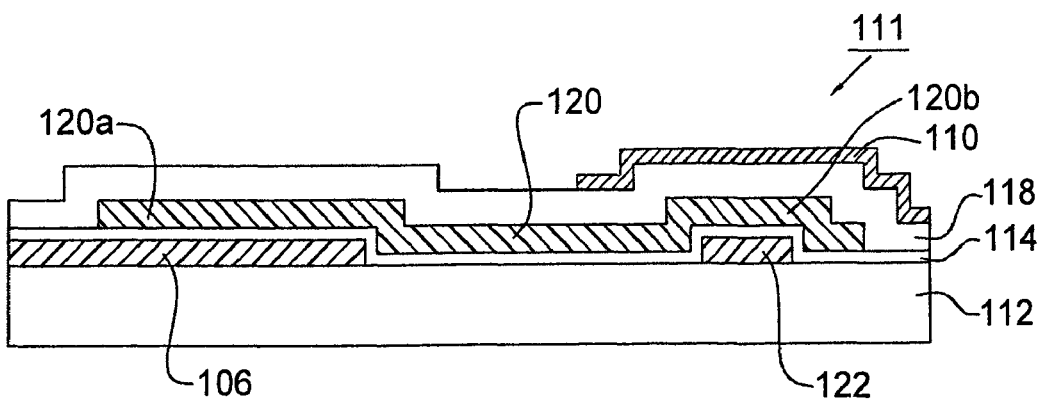

Referring to FIGS. 2, 3 and 7D, a pixel electrode 110 is formed on the protective layer 118 without overlapping with the gate line 106. In addition, the pixel electrode 110 is further formed into the contact hole 109 so as to be electrically connected to the drain electrode 108*b*. The pixel electrode 110 is formed by depositing at least one transparent conductive material, e.g. indium tin oxide (ITO), indium zinc oxide (IZO), indium oxide (IO), tin oxide (TO), zinc oxide (ZO), aluminum zinc oxide (AZO) or any other transparent conductive layer or any stacked conductive layer, on the protective layer 118, and then patterning it with a fifth mask.

According to the method for making the liquid crystal display device 100, the pixel repairing structure 111, together with the thin film transistor 108, is formed using the same masks and patterning processes. For example, the second auxiliary layer 122, together with the gate line 106, is formed on the substrate 112 through the same mask, i.e. the first mask, and the same patterning process. In addition, the first auxiliary layer 120, together with the data line 104, the source electrode 108*a* and the drain electrode 108*b*, is formed on the gate insulating layer 114 through the same mask, i.e. the third mask, and the same patterning process. Therefore, the pixel repairing structure 111 can be formed without using any additional mask and patterning process. In the pixel repairing structure 111 shown in FIG. 4, the second auxiliary layer 122 is formed to facilitate the formation of the welding point 124*b* shown in FIG. 6 for the electrical connection between the connecting portion 120*b* and the pixel electrode 110. Therefore, it should be understood that the second auxiliary layer 122 can be optionally formed in the liquid crystal display device 100.

Figure 8:
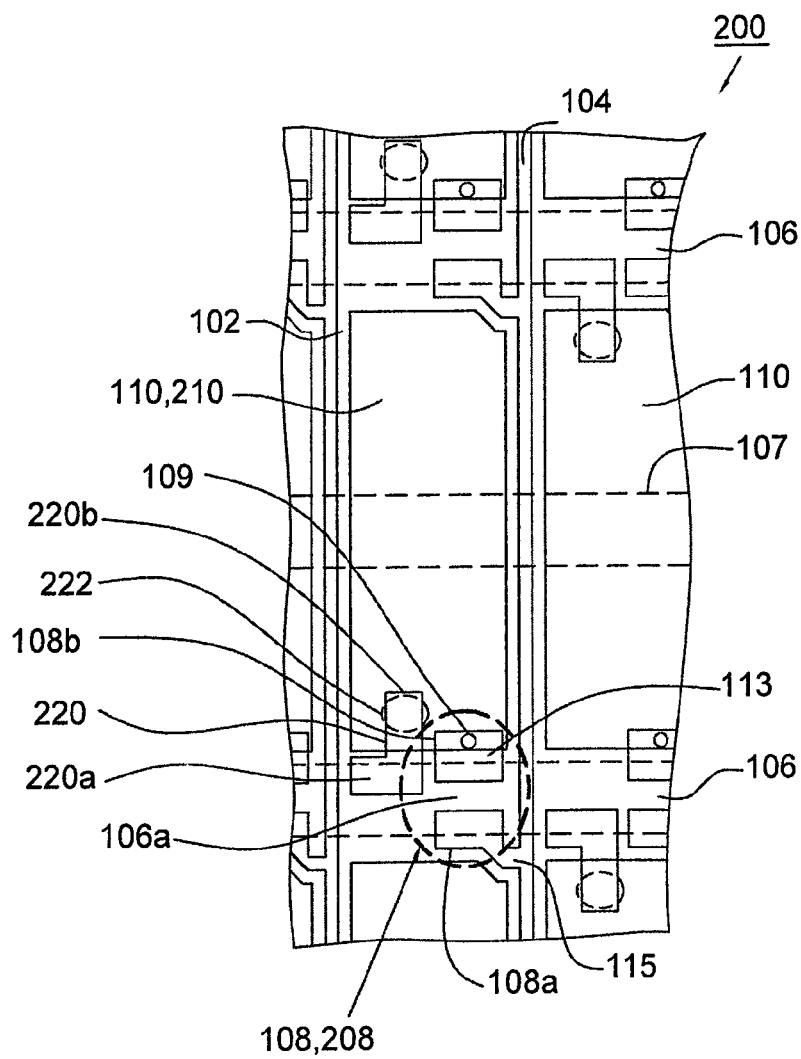
FIG. 8 shows a partial plan view of a liquid crystal display device according to another embodiment of the present invention.

FIG. 8 shows a partial plan view of a liquid crystal display device 200 according to another embodiment of the present invention. In FIG. 8, elements having the same functions as in the embodiment of FIG. 2 are denoted by the same numerals. The liquid crystal display device 200 is substantially the same with the liquid crystal display device 100 shown in FIG. 2 except that a first auxiliary layer 220 and a second auxiliary layer 222 are formed at the top edge of the pixel electrode 210 rather than the bottom edge of the pixel electrode 210 at which the first auxiliary layer 120 and the second auxiliary layer 122 shown in FIG. 2 are formed. In the other word, the first auxiliary layer 220 and the thin film transistor 108, 208 are overlapping the same pixel electrode 110, 210 and the gate line 106. In addition, the first auxiliary layer 220 has a connecting portion 220*a* overlapped with the gate line 106, which is coupled to the pixel electrode 110, 210 through the thin film transistor 208. The first auxiliary layer 220 further has a connecting portion 220*b* overlapped with the pixel electrode 110, 210 and the second auxiliary layer 222. Similarly, when a white defect occurs, the electrical path between the pixel electrode 210 and the drain electrode 108*b* of the thin film transistor 208 should be firstly cut off by a laser such that the pixel electrode 210 is made electrically isolated from the thin film transistor 208. Secondly, the pixel electrode 210 can be electrically connected to the gate line 106 by welding the connecting portion 220*a* of the first auxiliary layer 220 with the gate line 106, and welding the connecting portion 220*b* of the first auxiliary layer 220 with the pixel electrode 210 or welding the connecting portion 220*b* of the first auxiliary layer 220 with the pixel electrode 210 and the second auxiliary layer 222. Therefore, the white defect can be repaired as a black defect.

Figure 9:
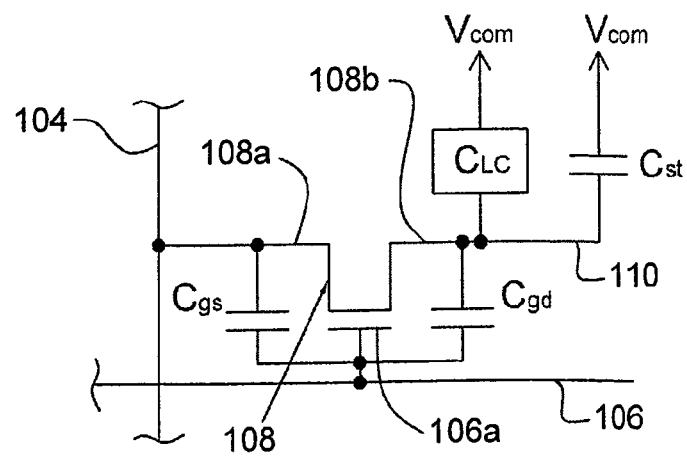
FIG. 9 shows an equivalent circuit of the liquid crystal display devices shown in FIGS. 2 and 8.

FIG. 9 shows an equivalent circuit of the liquid crystal display device shown in FIGS. 2 and 8. As shown in FIG. 9, the thin film transistor 108 has a capacitor Cgs formed between the gate electrode 106*a* and the source electrode 108*a*, and a capacitor Cgs formed between the gate electrode 106*a* and the drain electrode 108*b*. A liquid crystal capacitor CLC is formed between the pixel electrode 110 and a common electrode (not shown) having a common voltage Vcom. When the thin film transistor 108 is turned on, a voltage received from the data line 104 can be transferred to the pixel electrode 110 and then held in the liquid crystal capacitor CLC transitionally. Therefore, the voltage held in the liquid crystal capacitor CLC can be applied to the liquid crystal (not shown). In addition, a storage capacitor Cst is also formed between the pixel electrode 110 and the common electrode for enhancing the charge storing capacity of the liquid crystal capacitor CLC.

In the liquid crystal display devices 100 and 200 shown in FIGS. 2 and 8, the pixel electrode 110 is formed without overlapping with the two adjacent lines 106, that is, the pixel electrode 110 is non-overlapped with the two adjacent gate lines 106. In addition, both of the first auxiliary layers 120 and 220 are electrically insulated from the pixel electrode 110, 210 and the two adjacent gate lines 106. Therefore, each gate line 106 is free of capacitive load caused by the pixel electrode 110, 210 or any connecting portion electrically connected to the pixel electrode 110, 210 as shown in FIG. 9 such that the scan signal transmitted thereof will not be delayed.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A method for making a display, comprising:
   forming a first gate line adapted to transmit a first scan signal;
   forming a second gate line adjacent to the first gate line;
   forming a pixel electrode free of overlap with the first and second gate lines;
   forming a thin film transistor having a first electrode, a second electrode and a gate electrode, the first electrode electrically connected to the pixel electrode, the second electrode adapted to receive a data signal, and the gate electrode adapted to receive the first scan signal;
   forming a first auxiliary layer having a first connecting portion and a second connecting portion, the first connecting portion overlapped with the pixel electrode and the second connecting portion overlapped with one of the first and second gate lines, wherein the first auxiliary layer is electrically insulated from the pixel electrode, the first and second gate lines; and
   forming a storage capacitor line free of overlap with the first connecting portion of the first auxiliary layer.

2. The method as claimed in claim 1, wherein the pixel electrode is positioned between the first and second gate lines.

3. The method as claimed in claim 1, wherein the first auxiliary layer, the first and second electrodes are formed by same manufacturing processes.

4. The method as claimed in claim 1, further comprising:
   forming a gate insulating layer to cover the first and second gate lines, wherein the first electrode, the second electrode and the first auxiliary layer are further formed on the gate insulating layer; and
   forming a protective layer to cover the first electrode, the second electrode and the first auxiliary layer, wherein the pixel electrode is further formed on the protective layer.

5. The method as claimed in claim 4, further comprising:
   forming a semiconductor layer on the gate insulating layer, wherein a part of the first electrode and a part of the second electrode are further formed on the semiconductor layer.

6. A method for making a display, comprising:
   forming a first gate line;
   forming a storage capacitor line free of overlap with the first connecting portion of the first auxiliary layer;
   forming a pixel electrode adjacent to and free of overlap with the first gate line; and
   forming a pixel repairing structure, the pixel repairing structure comprising:
      a first auxiliary layer having a first connecting portion overlapped with the pixel electrode and a second connecting portion overlapped with the first gate line; and
      a second auxiliary layer overlapped with the first connecting portion of the first auxiliary layer;
   wherein the first auxiliary layer is electrically insulated from the pixel electrode, the first gate line and the second auxiliary layer.

7. The method as claimed in claim 6, further comprising:
   forming a second gate line adjacent to the first gate line and free of overlap with the pixel electrode such that the pixel electrode is positioned between the first and second gate lines.

8. The method as claimed in claim 7, wherein the second auxiliary layer is
   electrically isolated from the first and second gate lines and electrically insulated from the pixel electrode and electrically insulated from the storage capacitor line.

9. The method as claimed in claim 7, wherein the second auxiliary layer, the first gate line and the second gate line are formed by same manufacturing processes.

10. The method as claimed in claim 6, further comprising:
    forming a gate insulating layer to cover the first gate line and the second auxiliary layer, wherein the first auxiliary layer is further formed on the gate insulating layer; and
    forming a protective layer to cover the first auxiliary layer, wherein the pixel electrode is further formed on the protective layer.

11. A display, comprising:
    a first gate line for transmitting a first scan signal;
    a second gate line adjacent to the first gate line;
    a pixel electrode free of overlap with the first and second gate lines;
    a thin film transistor having a first electrode electrically connected to the pixel electrode, a second electrode for receiving a data signal, and a gate electrode for receiving the first scan signal;
    a first auxiliary layer having a first connecting portion overlapped with the pixel electrode and a second connecting portion overlapped with one of the first gate line and the second gate line, wherein the first auxiliary layer is electrically insulated from the pixel electrode, the first and second gate lines; and
    a storage capacitor line free of overlap with the first connecting portion of the first auxiliary layer.

12. The display as claimed in claim 11, wherein the pixel electrode is positioned between the first and second gate lines.

13. The display as claimed in claim 11, further comprising:
    a gate insulating layer covering the first and second gate lines, wherein the first electrode, the second electrode and the first auxiliary layer are formed on the gate insulating layer; and
    a protective layer covering the first electrode, the second electrode and the first auxiliary layer, wherein the pixel electrode is formed on the protective layer.

14. The display as claimed in claim 13, further comprising:
    a semiconductor layer formed on the gate insulating layer, wherein a part of the first electrode and a part of the second electrode are formed on the semiconductor layer.

15. A display, comprising:
    a first gate line;
    a storage capacitor line;
    a pixel electrode adjacent to and free of overlap with the first gate line; and
    a pixel repairing structure, comprising:
       a first auxiliary layer having a first connecting portion and a second connecting portion, wherein the first connecting portion is overlapped with the pixel electrode and free of overlap with the storage capacitor line, the second connecting portion is overlapped with the first gate line; and
       a second auxiliary layer overlapped with the first connecting portion of the first auxiliary layer;
    wherein the first auxiliary layer is electrically insulated from the pixel electrode, the first gate line and the second auxiliary layer.

16. The display as claimed in claim 15, further comprising:
a second gate line adjacent to the first gate line and free of overlap with the pixel electrode such that the pixel electrode is positioned between the first and second gate lines.

17. The display as claimed in claim 16, wherein the second auxiliary layer is electrically isolated from the first and second gate lines and electrically insulated from the pixel electrode.

18. The display as claimed in claim 15, wherein the second auxiliary layer is electrically isolated from the first gate line and electrically insulated from the pixel electrode.

19. The display as claimed in claim 15, further comprising:
a gate insulating layer covering the first gate line and the second auxiliary layer, wherein the first auxiliary layer is formed on the gate insulating layer; and
a protective layer covering the first auxiliary layer, wherein the pixel electrode is formed on the protective layer.

* * * * *